United States Patent
Wu

(10) Patent No.: US 8,228,851 B2
(45) Date of Patent: Jul. 24, 2012

(54) METHOD FOR HANDLING RANDOM ACCESS RESPONSE RECEPTION AND AN E-UTRAN AND USER EQUIPMENT THEREOF

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 820 days.

(21) Appl. No.: 12/264,186

(22) Filed: Nov. 3, 2008

(65) Prior Publication Data

US 2010/0111032 A1 May 6, 2010

(51) Int. Cl.
*H04W 4/00* (2009.01)
(52) U.S. Cl. ........................ 370/329; 370/331
(58) Field of Classification Search .................. None
See application file for complete search history.

(56) References Cited

U.S. PATENT DOCUMENTS

| 2009/0175253 | A1* | 7/2009 | Wu et al. | 370/338 |
| 2009/0232058 | A1* | 9/2009 | Lee et al. | 370/328 |
| 2009/0303896 | A1* | 12/2009 | Che et al. | 370/252 |
| 2009/0316593 | A1* | 12/2009 | Wang et al. | 370/252 |
| 2010/0040001 | A1* | 2/2010 | Montojo et al. | 370/329 |
| 2010/0041370 | A1* | 2/2010 | Narasimha et al. | 455/410 |
| 2010/0085926 | A1* | 4/2010 | Harada et al. | 370/329 |
| 2010/0085956 | A1* | 4/2010 | Ahn et al. | 370/344 |
| 2011/0032876 | A1* | 2/2011 | Lee et al. | 370/328 |
| 2011/0096725 | A1* | 4/2011 | Chun et al. | 370/328 |
| 2011/0099447 | A1* | 4/2011 | Park et al. | 714/748 |

OTHER PUBLICATIONS

3GPP, 3rd Generation Partnership Project; Technical Specification Group Radio Access Network, "Evolved Universal Terrestrial Radio Access (E-UTRA) Medium Access Control (MAC) protocol specification (Release 8)", Sep. 2008, pp. 1-36, 3GPP TS 36.321 V8.3.0, France, XP002565444.
LG Electronics Inc., "Correction to RACH Procedure", 3GPP TSG-RAN2 Meeting #63bis, Sep. 29-Oct. 3, 2008, R2-085236, Prague, Czech Republic, XP050320135.
Nokia Corporation et al., "RACH partition message size", 3GPP TSG-RAN WG2 Meeting #63bis, R2-085083, Sep. 29-Oct. 3, 2008, Prague, Czech Republic, XP050320026.

* cited by examiner

*Primary Examiner* — Andrew Lee
(74) *Attorney, Agent, or Firm* — Winston Hsu; Scott Margo

(57) ABSTRACT

A method for handling Random Access Response reception in a user equipment (UE) when communicating with a E-UTRAN is provided. The method includes: transmitting a RA preamble to the E-UTRAN for initialing a random access (RA) procedure according to a received trigger event; receiving a RA response from the E-UTRAN corresponding to the RA preamble; and determining whether a MAC PDU or another RA preamble need to be transmitted according to an UL grant in the RA response and the trigger event.

38 Claims, 15 Drawing Sheets

| | | |
|---|---|---|
| TA | | Oct 1 |
| TA | UL Grant | Oct 2 |
| UL Grant | | Oct 3 |
| UL Grant | | Oct 4 |
| Temporary C-RNTI | | Oct 5 |
| Temporary C-RNTI | | Oct 6 |

FIG. 3 PRIOR ART

METHOD FOR HANDLING RANDOM ACCESS RESPONSE RECEPTION AND AN E-UTRAN AND USER EQUIPMENT THEREOF

BACKGROUND OF THE INVENTION

1. Field of the Invention

The present invention relates to a wireless communication system, and more particularly, to a method for handling Random Access Response reception in a user equipment and an E-UTRAN and related devices.

2. Description of the Prior Art

With the arrival of the information age, the requirements for mobile voice and data communications, and various other mobile services are increasing daily. The communication systems of prior art are facing bottlenecks of channel usage overflow and inefficient transmission speeds. Therefore, fourth generation mobile communication has been developed to make better use of the frequency spectrum and higher-speed transmission service. Fourth generation mobile communication has various versions, of which presently the long term evolution (LTE) system provided with the Third Generation Project Partnership (3GPP) standard is the one most used worldwide due to considerations of system compatibility and manufacturer support.

Please refer to FIG. 1. FIG. 1 is a diagram showing the architecture of the radio interface protocol of a LTE system according to the prior art. As shown in FIG. 1, the radio interface protocol of the LTE system includes three layers: the Physical Layer (L1), the Data Link Layer (L2), and the Network Layer (L3), wherein a control plane of L3 is a Radio Resource Control (RRC) layer, and L2 is further divided into a Packet Data Convergence Protocol (PDCP) layer, a Radio Link Control (RLC) layer, and a Medium Access Control (MAC) layer.

FIG. 2 is a diagram showing a Random Access (RA) procedure of the LTE system according to the prior art. As can be seen from FIG. 2, when a user equipment (UE) 210 initials an RA procedure, an RA preamble is transmitted from the UE 210 to the Evolved UMTS Terrestrial Radio Access Network (E-UTRAN) 220. The E-UTRAN 220 needs to transmit an RA response (RAR) corresponding to the RA preamble to the UE 210. After that, the UE 210 transmits a media access control protocol data unit (MAC PDU) to the E-UTRAN 220, wherein the MAC PDU usually consists of a MAC header and one or more MAC Control Elements (CE). A MAC RAR usually consists of three fields: TA/UL Grant/Temporary C-RNTI (as shown in FIG. 3).

However, the UL Grant field included in the MAC RAR is not defined clearly, and it is not clear how to handle the UL grant field in some scenarios. For example, how to handle the UL grant field in the MAC RAR is not specified in the 3GPP specification, especially when the UE has no data for transmission. In addition, the 3GPP specification defines that the eNB of the E-UTRAN should not provide a grant field smaller than 80 bits in the RA response when an uplink transmission is required. But this limitation is not suitable in some scenarios. Hence, a mechanism for handling the UL grant field in the MAC RAR needs to be improved.

SUMMARY OF THE INVENTION

It is one of the objectives of the present invention to provide a method for handling Random Access Response reception in a UE and an E-UTRAN and related devices to solve the abovementioned problems.

According to an exemplary embodiment of the present invention, a method for handling Random Access Response reception in a user equipment (UE) when communicating with an E-UTRAN is provided. The method includes: transmitting an RA preamble to the E-UTRAN for initialing a random access (RA) procedure according to a received trigger event; receiving an RA response from the E-UTRAN corresponding to the RA preamble; and determining whether a media access control protocol data unit (MAC PDU) or another RA preamble need to be transmitted according to an uplink (UL) grant in the RA response and the trigger event.

According to another exemplary embodiment of the present invention, a method for handling Random Access Response reception in an E-UTRAN when communicating with a UE is provided. The method includes: receiving an RA preamble from the UE; determining an uplink (UL) grant in an RA response corresponding to the RA preamble, wherein the UL grant indicates a size which is determined according to a trigger event used to trigger the RA preamble; and transmitting the RA response to the UE. The trigger event is a packet data control channel (PDCCH) order.

According to another exemplary embodiment of the present invention, a UE for handling Random Access Response reception when communicating with an E-UTRAN is provided. The UE includes a transmitting module, a receiving module, and a determining module. The transmitting module is used for transmitting an RA preamble to the E-UTRAN for initialing a random access (RA) procedure according to a received trigger event. The receiving module is used for receiving an RA response from the E-UTRAN corresponding to the RA preamble. The determining module is used for determining whether a media access control protocol data unit (MAC PDU) or another RA preamble need to be transmitted according to an uplink (UL) grant in the RA response and the trigger event.

According to another exemplary embodiment of the present invention, an E-UTRAN for handling Random Access Response reception when communicating with a UE is provided. The E-UTRAN includes a receiving module, a UL grant determining module, and a transmitting module. The receiving module is used for receiving an RA preamble from the UE. The UL grant determining module is used for determining an UL grant in an RA response corresponding to the RA preamble, wherein the UL grant indicates a size which is determined according to a trigger event used to trigger the RA preamble. The transmitting module is used for transmitting the RA response to the UE.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 is a diagram showing the fields included in the RA Response.

DETAILED DESCRIPTION

Figure 1:
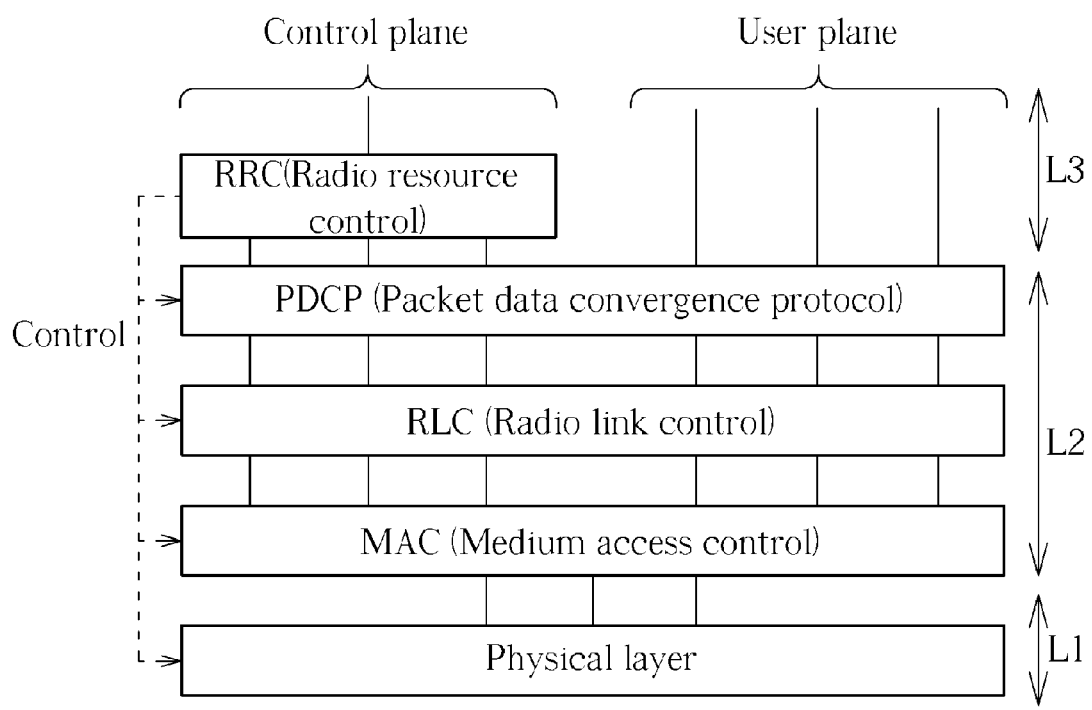
FIG. 1 is a diagram showing the architecture of the radio interface protocol of a LTE system according to the prior art.
Figure 2:
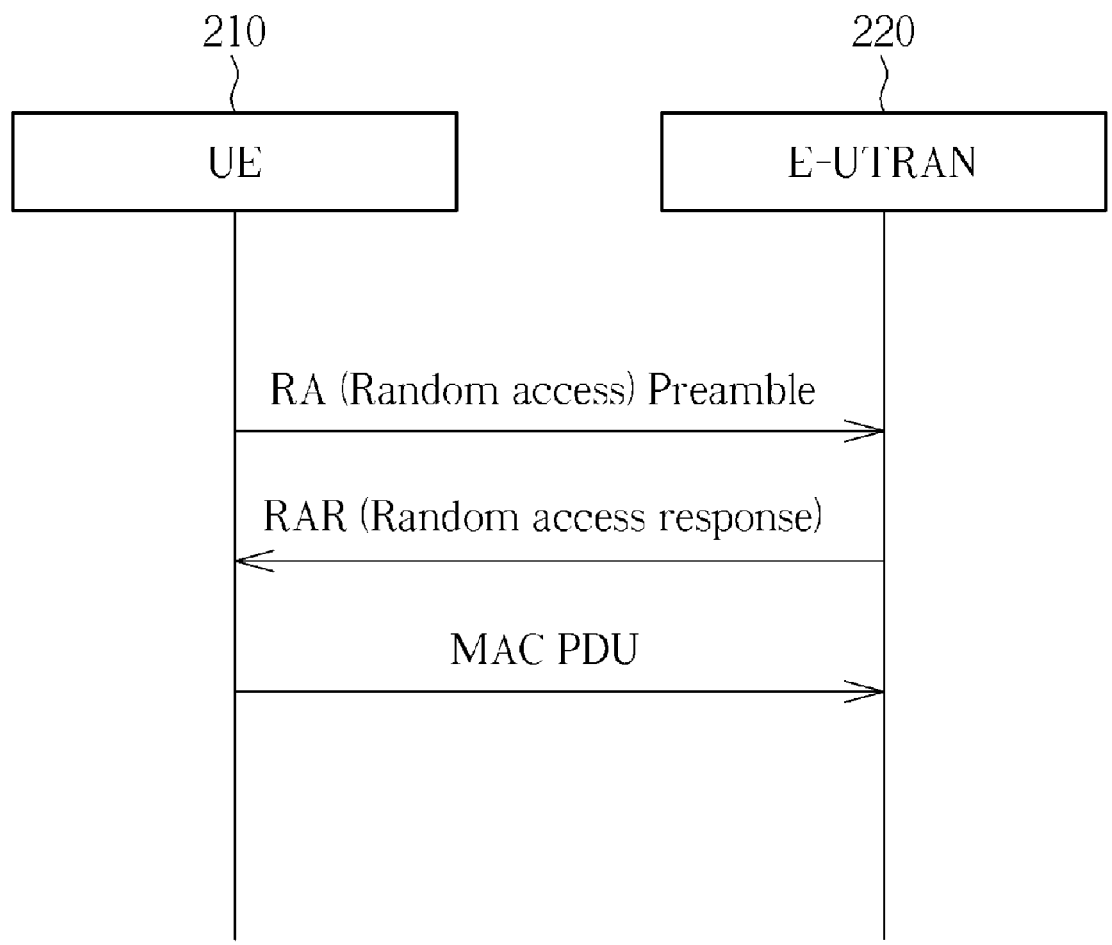
FIG. 2 is a diagram showing an RA procedure of the LTE system according to the prior art.
Figure 4:
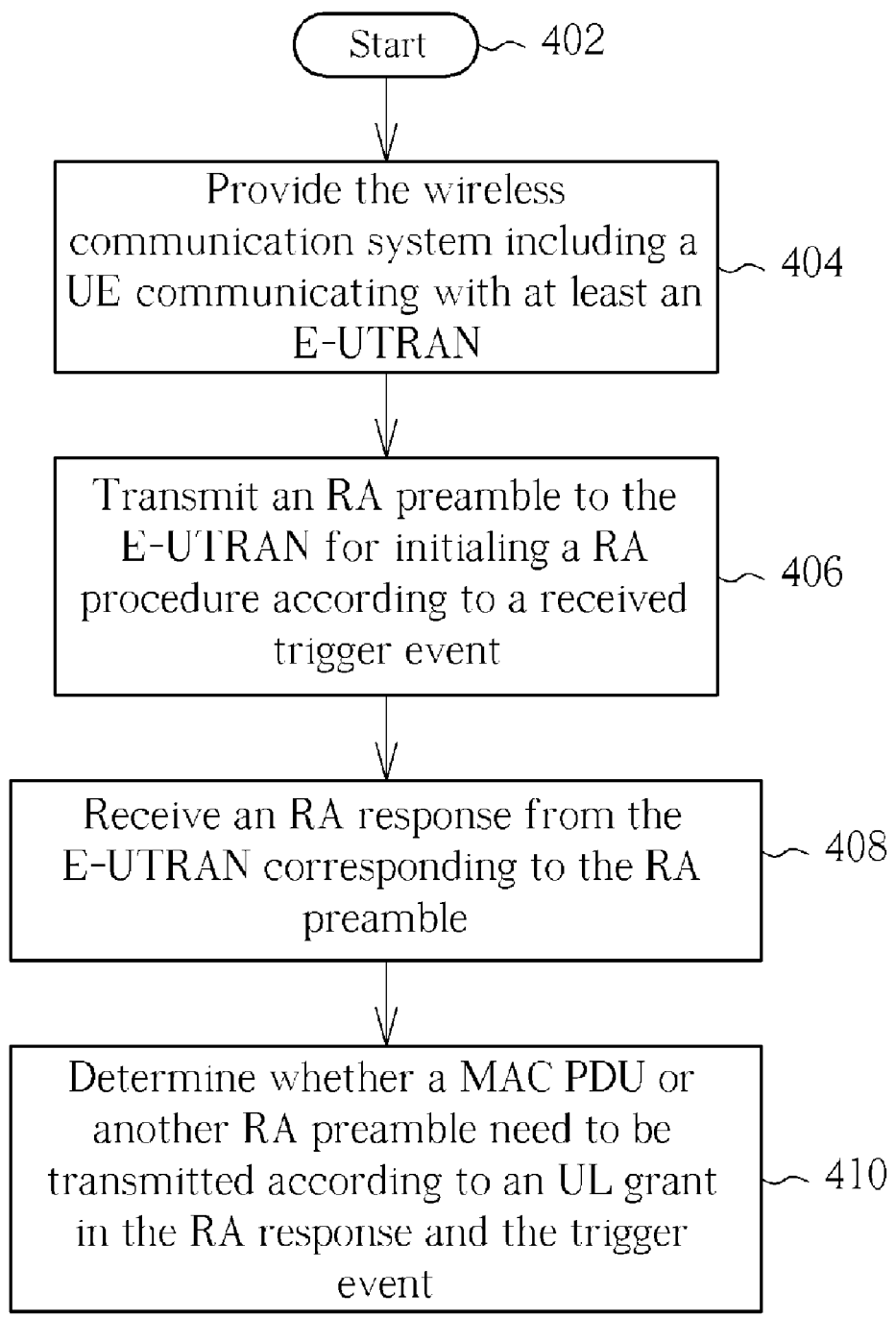
FIG. 4 is a flowchart illustrating a method for handling RA Response reception in a UE communicating with an E-UTRAN according to an exemplary embodiment of the present invention.

Please refer to FIG. 4. FIG. 4 is a flowchart illustrating a method for handling RA Response reception in a UE communicating with an E-UTRAN according to an exemplary embodiment of the present invention. Please note that the following steps are not limited to being performed according to the sequence shown in FIG. 4 if a roughly identical result can be obtained. The method includes (but is not limited to) the following steps:

Step 402: Start.

Step 404: Provide the wireless communication system including a UE communicating with at least an E-UTRAN.

Step 406: Transmit an RA preamble to the E-UTRAN for initialing a random access (RA) procedure according to a received trigger event.

Step 408: Receive an RA response from the E-UTRAN corresponding to the RA preamble.

Step 410: Determine whether a media access control protocol data unit (MAC PDU) or another RA preamble need to be transmitted according to an uplink (UL) grant in the RA response and the trigger event.

Figure 5:
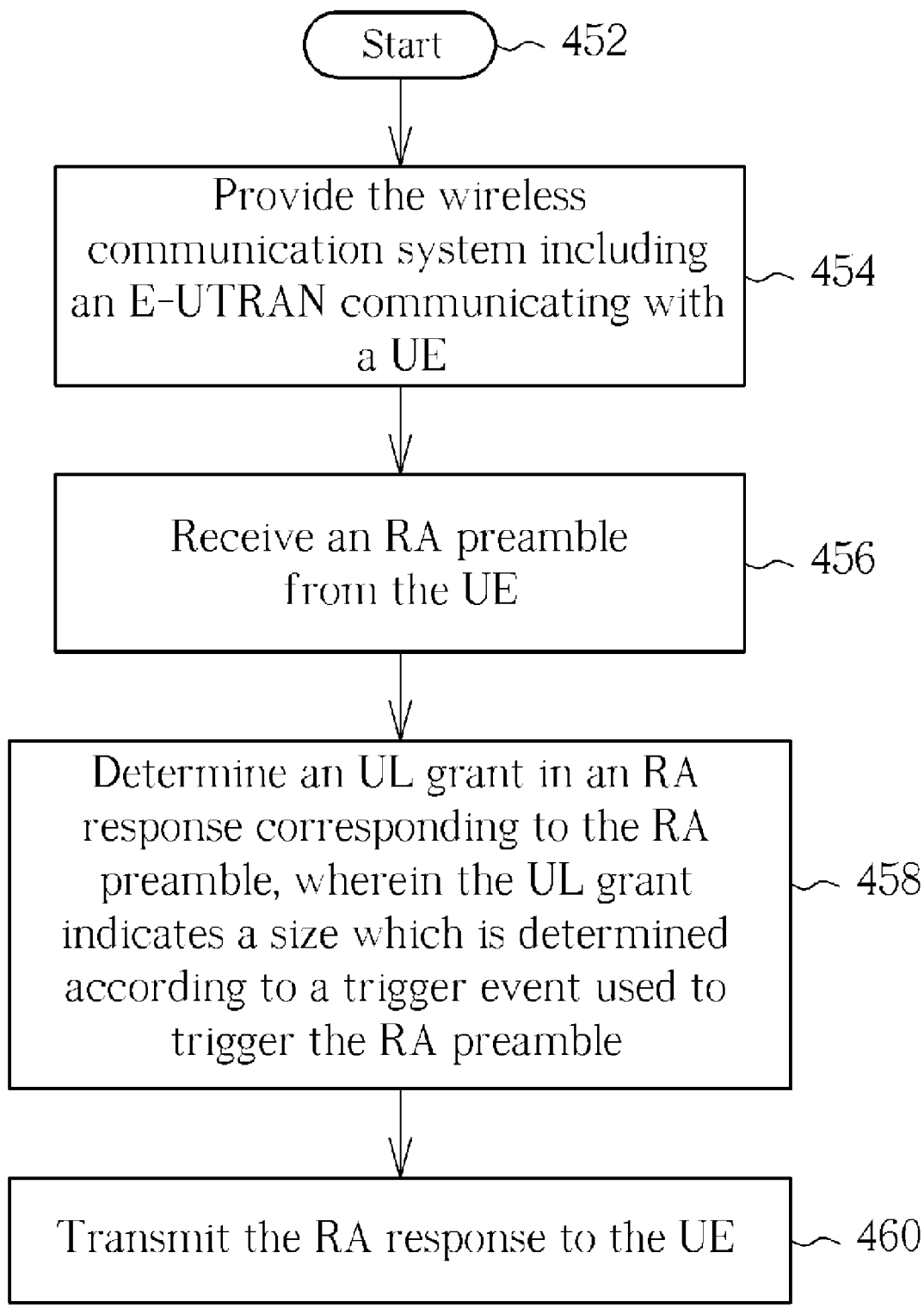
FIG. 5 is a flowchart illustrating a method for handling RA Response reception in an E-UTRAN communicating with a UE according to another exemplary embodiment of the present invention.

Please refer to FIG. 5. FIG. 5 is a flowchart illustrating a method for handling RA Response reception in an E-UTRAN communicating with a UE according to an exemplary embodiment of the present invention. The method shown in FIG. 5 includes (but is not limited to) the following steps:

Step 452: Start.

Step 454: Provide the wireless communication system including an E-UTRAN communicating with a UE.

Step 456: Receive an RA preamble from the UE.

Step 458: Determine an UL grant in an RA response corresponding to the RA preamble, wherein the UL grant indicates a size which is determined according to a trigger event used to trigger the RA preamble.

Step 460: Transmit the RA response to the UE.

The steps of the methods mentioned above are merely practicable embodiments of the present invention, and in no way should be considered to be limitations of the scope of the present invention. The method can include other intermediate steps or several steps can be merged into a single step for suitable modifications without departing from the spirit of the present invention.

Figure 6:
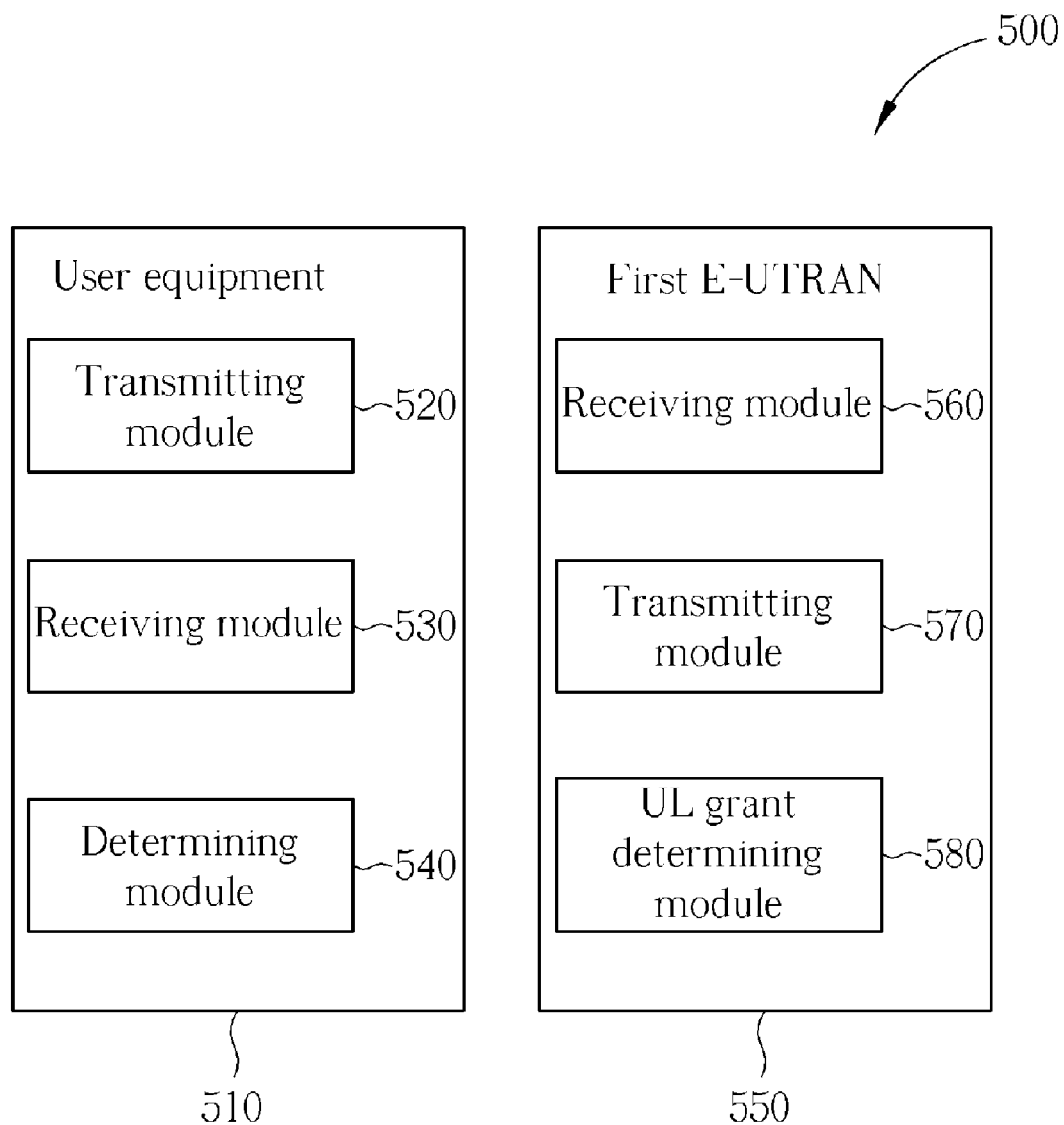
FIG. 6 is a block diagram showing a wireless communication system according to an embodiment of the present invention.

Please refer to FIG. 6. FIG. 6 is a block diagram showing a wireless communication system 500 according to an embodiment of the present invention. The wireless communication 500 can be a LTE system, but this should not be a limitation of the present invention, and can be wireless communication systems of other types. The wireless communication system 500 includes, but is not limited to, a UE 510 and a first E-UTRAN 550. The UE 510 includes a transmitting module 520, a receiving module 530, and a determining module 540. The determining module 540 is used for determining whether a MAC PDU or another RA preamble needs to be transmitted according to an UL grant in the RA response and the trigger event. The first E-UTRAN 550 includes a receiving module 560, a transmitting module 570, and a UL grant determining module 580. The UL grant determining module 580 of the E-UTRAN 550 is used for determining an UL grant in an RA response corresponding to the RA preamble, wherein the UL grant indicates a size which is determined according to a trigger event used to trigger the RA preamble.

Figure 7:
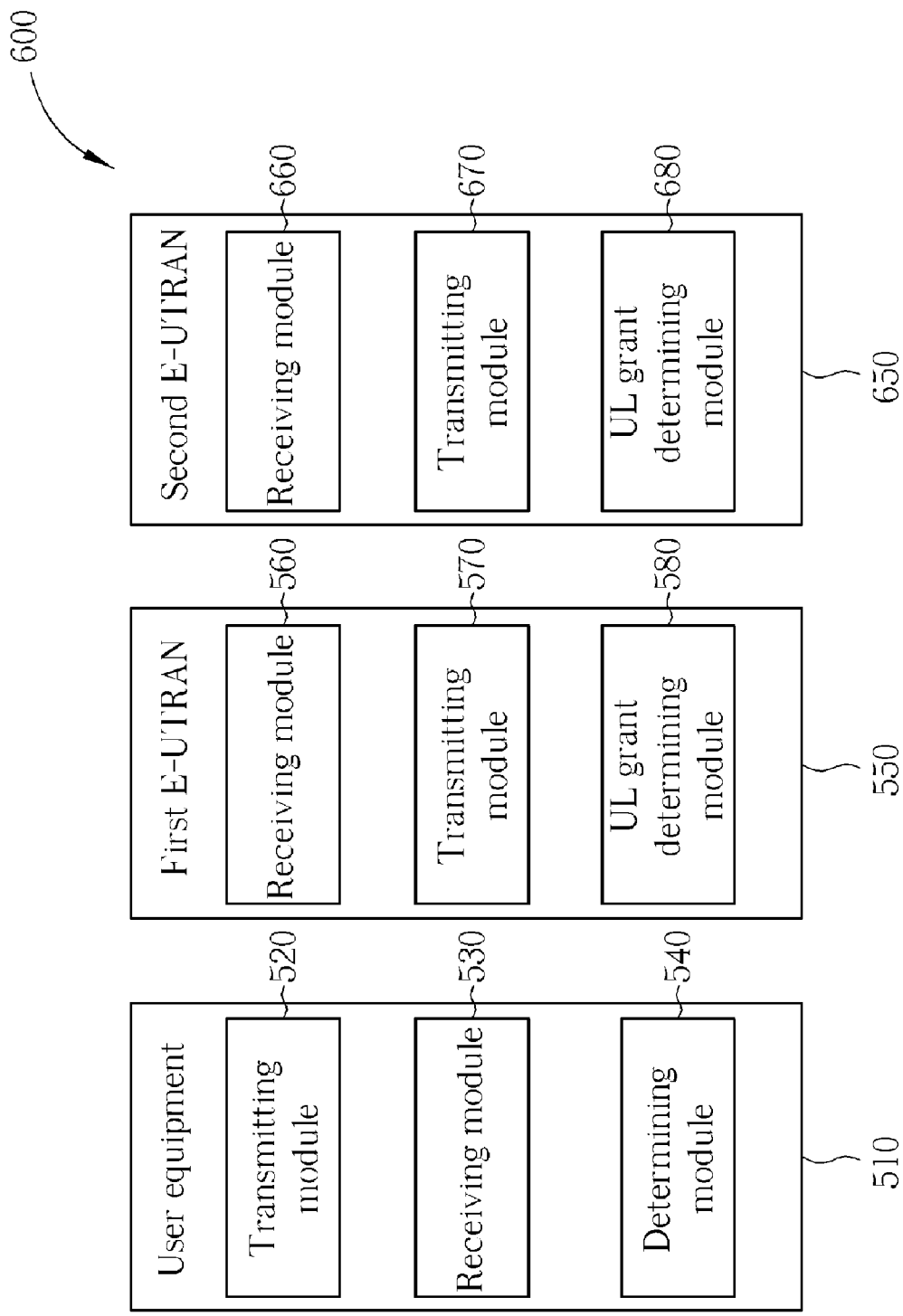
FIG. 7 is a block diagram showing a wireless communication system according to another embodiment of the present invention.

FIG. 7 is a block diagram showing a wireless communication system 600 according to another embodiment of the present invention. The wireless communication system 600 is similar to the wireless communication system 500 shown in FIG. 6, the difference between them being that the wireless communication system 600 further includes a second E-UTRAN 650 having a receiving module 660, a transmitting module 670, and a UL grant determining module 680 and the UE 510 is handed over from the first E-UTRAN 550 to the second E-UTRAN 650. The operations of the UE and the E-UTRAN(s) will be detailed in the following embodiments and figures.

Figure 8:
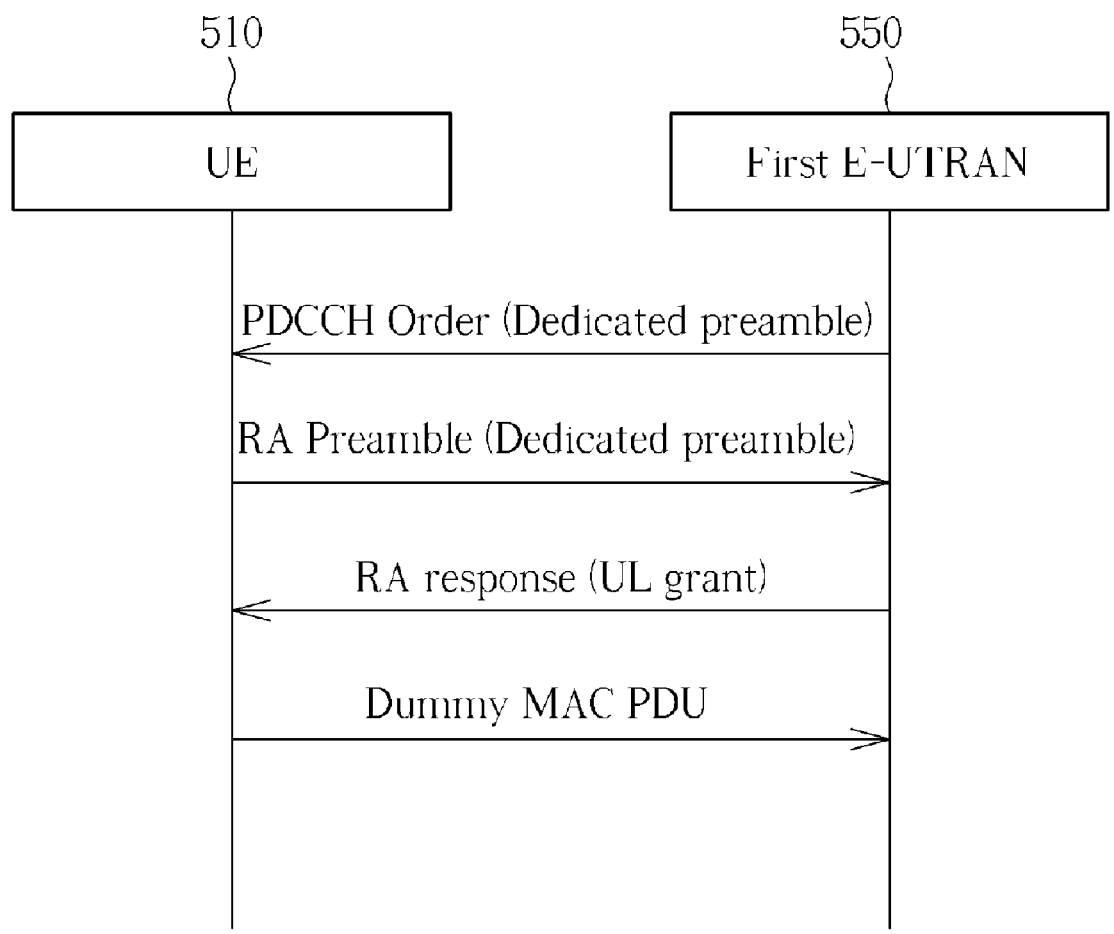
FIG. 8 is a diagram showing an RA procedure of the wireless communication system according to a first embodiment of the present invention.

Please refer to FIG. 8 in conjunction with the elements shown in FIG. 6. FIG. 8 is a diagram showing an RA procedure of the wireless communication system (including the UE and the first E-UTRAN) according to a first embodiment of the present invention. In this embodiment, an RA procedure is triggered by DL data arrival with a dedicated preamble (that is, the received trigger event is DL data arrival with a dedicated preamble) and the UE 510 has no available data for transmission. When the receiving module 560 of the first E-UTRAN 550 receives the RA preamble from the UE 510, the transmitting module 570 of the first E-UTRAN 550 transmits an RA response corresponding to the RA preamble to the UE 510, wherein an UL grant is included in the RA response. Although the UE 510 has no data for transmission, the UE 510 still needs to transmit a predetermined MAC PDU to notify the first E-UTRAN 550 that it has received the RA response. Thus the determining module 540 of the UE 510 determines whether a MAC PDU or another RA preamble needs to be transmitted according to the UL grant in the RA response and the trigger event. The transmitting module 520 of the UE 510 then subsequently transmits a dummy MAC PDU as the predetermined MAC PDU to the first E-UTRAN 550, wherein the dummy MAC PDU has no upper layer (upper than the MAC layer) data included and only MAC layer information is included, e.g. a Buffer Status Report (BSR) control element or padding. The UL grant determining module 580 of the first E-UTRAN 550 determines an UL grant in the RA response corresponding to the RA preamble, wherein the UL grant indicates a size of the dummy MAC PDU subsequently received from the UE 510.

Figure 9:
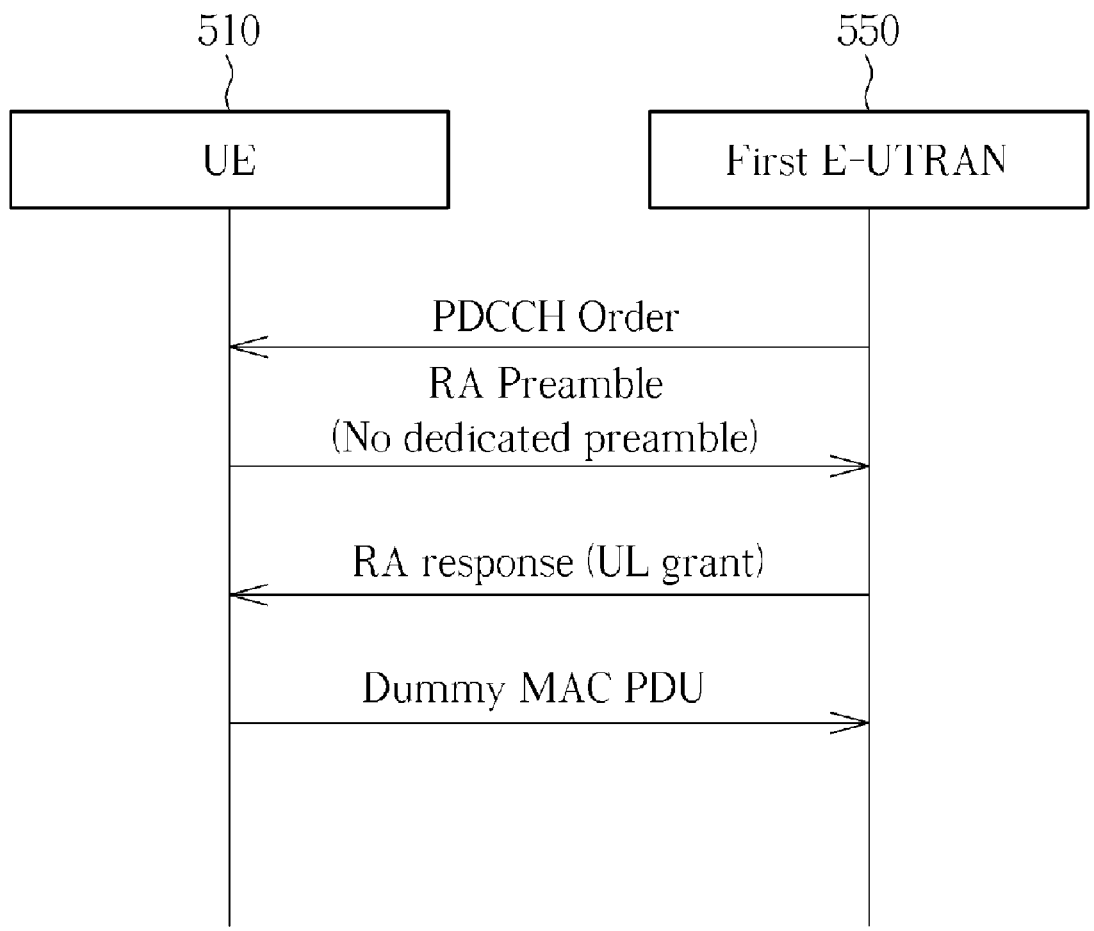
FIG. 9 is a diagram showing an RA procedure of the wireless communication system according to a second embodiment of the present invention.

Please refer to FIG. 9 in conjunction with the elements shown in FIG. 6. FIG. 9 is a diagram showing an RA procedure of the wireless communication system (including the UE and the first E-UTRAN) according to a second embodiment of the present invention. In this embodiment, an RA procedure is triggered by DL data arrival without a dedicated preamble (that is, the received trigger event is DL data arrival without a dedicated preamble) and the UE 510 has no available data for transmission. Although the UE 510 has no data for transmission, the UE 510 still needs to transmit a predetermined MAC PDU to notify the E-UTRAN 550 that it has received the RA response. Thus the determining module 540 of the UE 510 determines whether a MAC PDU or another RA preamble needs to be transmitted according to the UL grant in the RA response and the trigger event. The transmitting module 520 of the UE 510 then subsequently transmits a dummy MAC PDU as the predetermined MAC PDU to the first E-UTRAN 550, wherein the dummy MAC PDU is the same as that indicated in the first embodiment.

Figure 10:
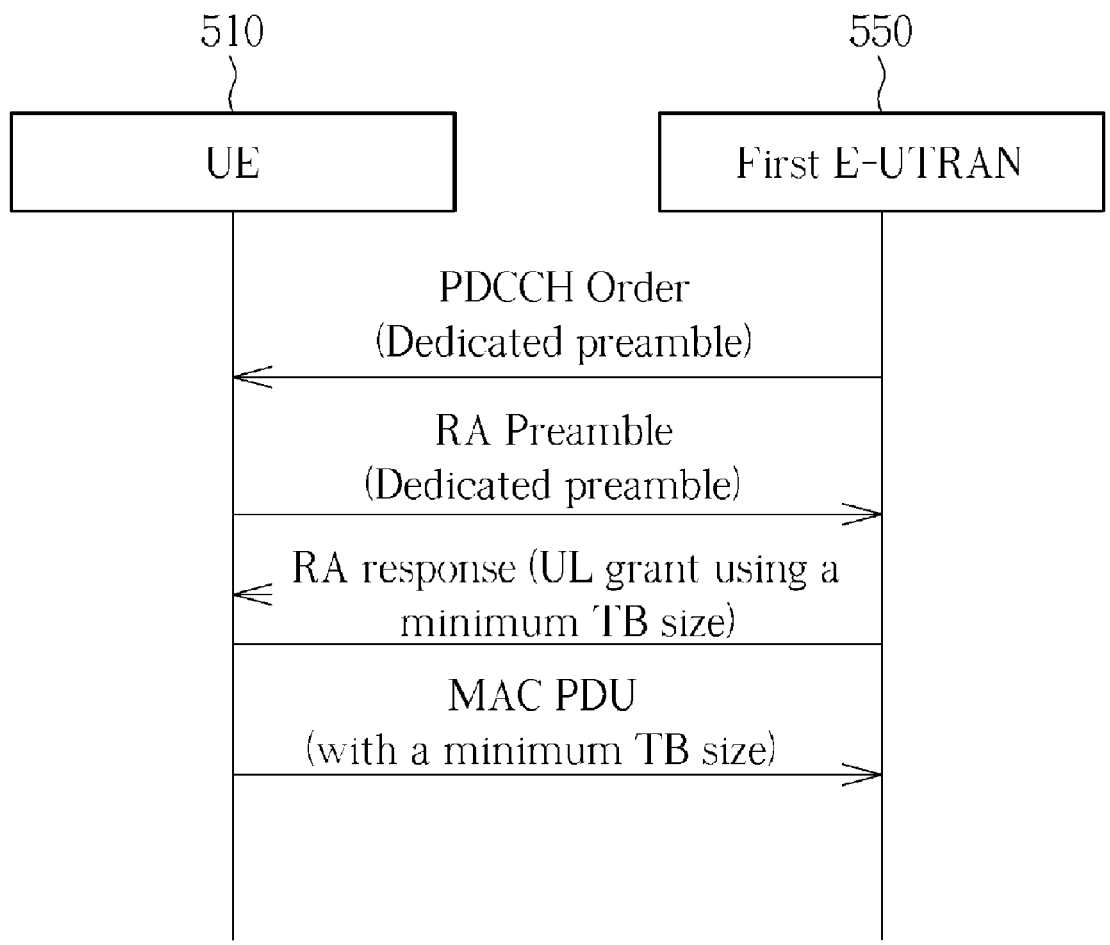
FIG. 10 is a diagram showing an RA procedure of the wireless communication system according to a third embodiment of the present invention.

Please refer to FIG. 10 in conjunction with the elements shown in FIG. 6. FIG. 10 is a diagram showing an RA procedure of the wireless communication system (including the UE and the first E-UTRAN) according to a third embodiment of the present invention. In this embodiment, the RA procedure is triggered by DL data arrival with a dedicated preamble (that is, the received trigger event is DL data arrival with a dedicated preamble). Due to DL data arrival, it seems reasonable that the first E-UTRAN 550 need not provide the UL grant (i.e. UL grant=0). However, the first E-UTRAN 550 cannot know whether the UE 510 receives the RA response or not. Thus the determining module 540 of the UE 510 determines whether a MAC PDU or another RA preamble needs to be transmitted according to the UL grant in the RA response and the trigger event. The transmitting module 520 of the UE 510 then subsequently transmits a designated MAC PDU as the predetermined MAC PDU for confirming the reception of the RA response. A size of the designated MAC PDU equals a minimum transport block (TB) size to save radio resources and transmission power. The UL grant determining module 580 of the first E-UTRAN 550 determines the UL grant in the RA response corresponding to the RA preamble, wherein the UL grant is used for the UE 510 to send the designated MAC PDU for confirming the reception of the RA response.

Figure 11:
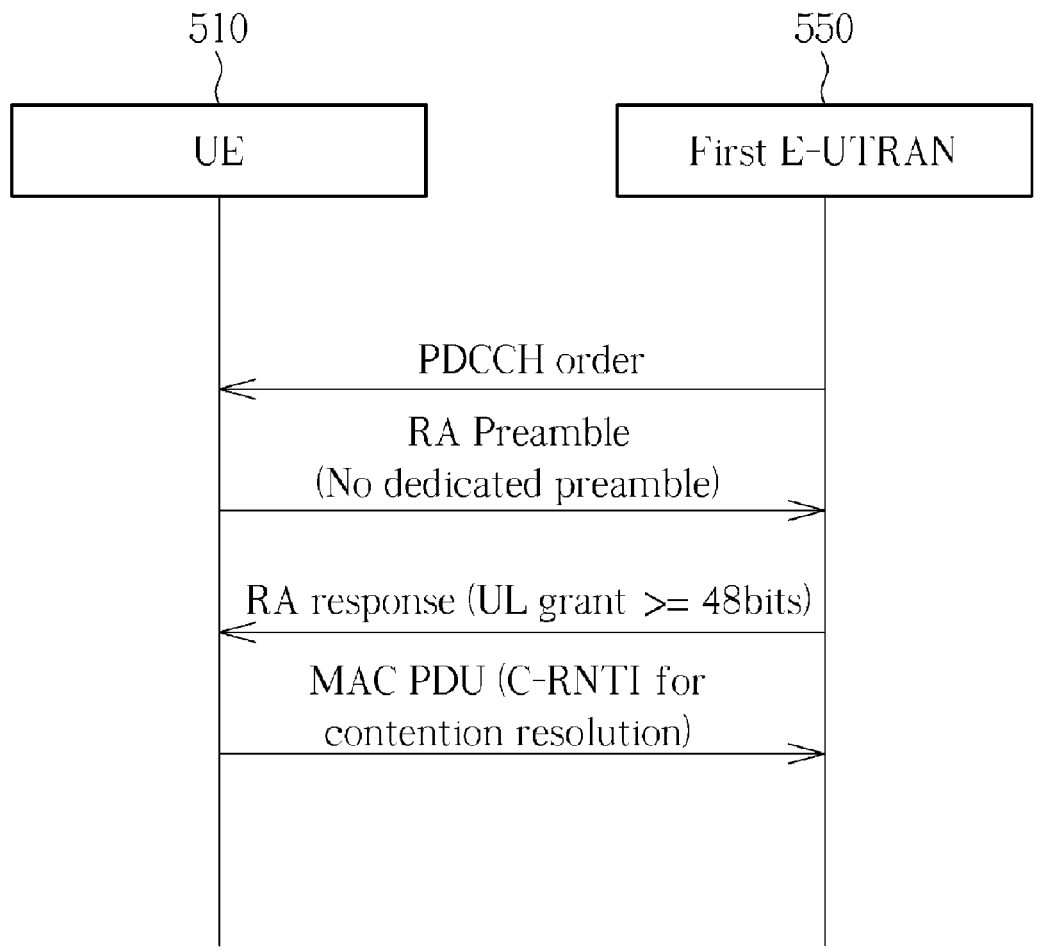
FIG. 11 is a diagram showing an RA procedure of the wireless communication system according to a fourth embodiment of the present invention.

Please refer to FIG. 11 in conjunction with the elements shown in FIG. 6. FIG. 11 is a diagram showing an RA procedure of the wireless communication system (including the UE and the first E-UTRAN) according to a fourth embodiment of the present invention. In this embodiment, the RA procedure is triggered by a physical downlink control channel (PDCCH) order and the first E-UTRAN 550 transmits the PDCCH order to the UE 510. If the UE 510 has no RLC data for transmission and the first E-UTRAN 550 has data to transmit to the UE 510, the first E-UTRAN 550 needs to provide the UL grant to transmit a predetermined MAC PDU including a C-RNTI control element for contention resolution. A size of the C-RNTI control element is 16 bits and its corresponding MAC sub-header has a size of 8 bits. Besides, a size of CRC is 24 bits needed for a MAC PDU. Therefore, the minimum size of the predetermined MAC PDU needed for contention resolution is 48 bits. The transmitting module 520 of the UE 510 then transmits a designated MAC PDU as the predetermined MAC PDU for contention resolution. The UL grant determining module 580 of the first E-UTRAN 550 determines the UL grant in the RA response corresponding to the RA preamble, wherein the size of the designated MAC PDU is not smaller than 48 bits. Compared with the prior art's wasting of radio resources to provide a MAC PDU with a size of 80 bits. In addition, the probability of erroneously decoding a MAC PDU with 48 bits is smaller than the probability of erroneously decoding a MAC PDU with 80 bits. The delay for random access channel (RACH) procedure can be reduced because fewer HARQ retransmissions are needed to decode a MAC PDU with 48 bits successfully than to decode a MAC PDU with 80 bits.

Figure 12:
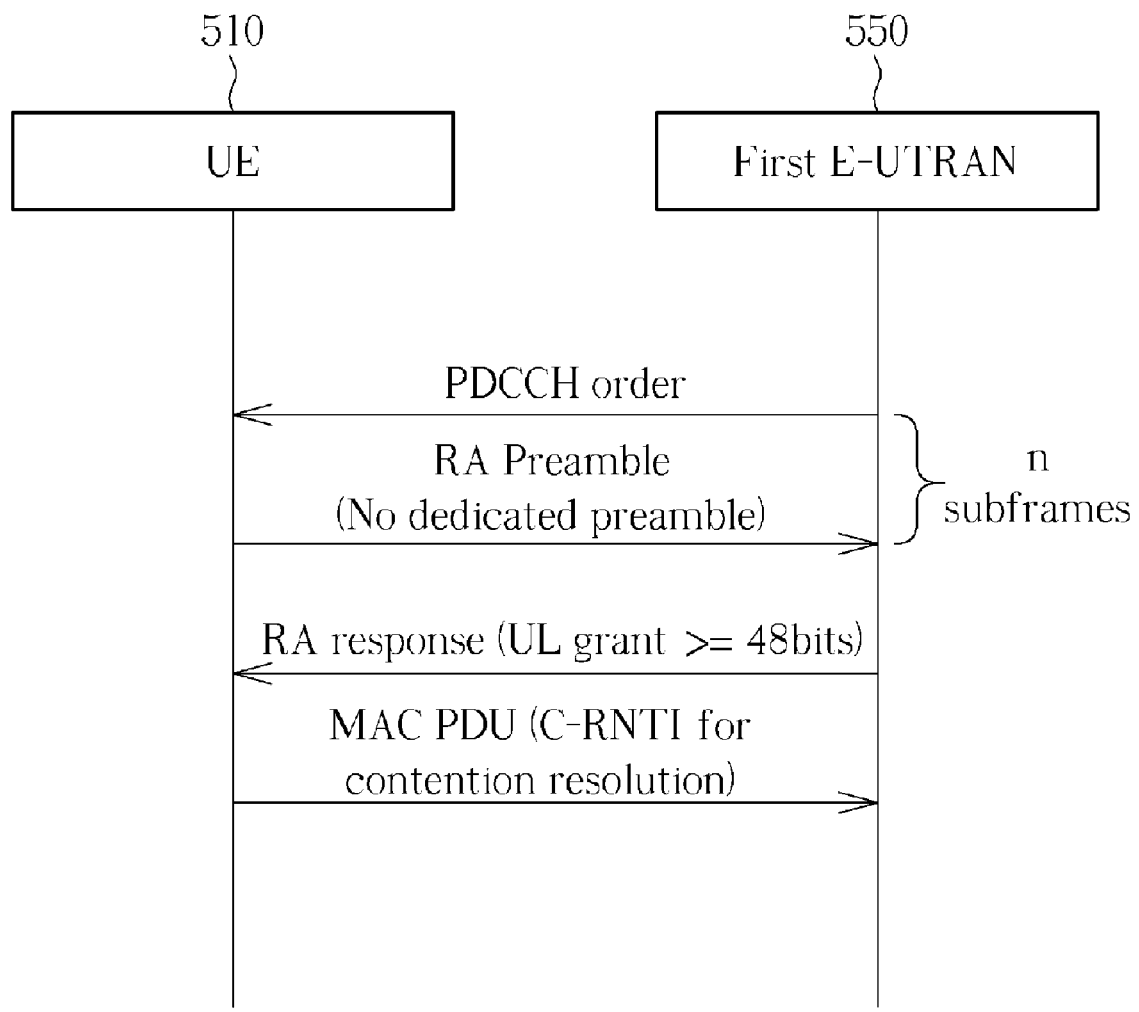
FIG. 12 is a diagram showing an RA procedure of the wireless communication system according to a fifth embodiment of the present invention.

Please refer to FIG. 12 in conjunction with the elements shown in FIG. 6. FIG. 12 is a diagram showing an RA procedure of the wireless communication system (including the UE and the first E-UTRAN) according to a fifth embodiment of the present invention. Following the fourth embodiment shown in FIG. 11, the difference between them being that the RA preamble is received n subframes after a transmission of the PDCCH order, wherein the value of n is determined by a sum of a UE processing time plus a PDCCH transmission time plus a random access channel (RACH) transmission time plus a delay due to physical RACH (PRACH) allocation. It determines that the RA procedure is triggered by DL data arrival. The transmitting module 520 of the UE 510 then transmits a designated MAC PDU as the predetermined MAC PDU for contention resolution. The UL grant determining module 580 of the first E-UTRAN 550 determines an UL grant in the RA response according to a size of the designated MAC PDU subsequently received from the UE 510, wherein the size of the designated MAC PDU is not smaller than 48 bits.

Figure 13:
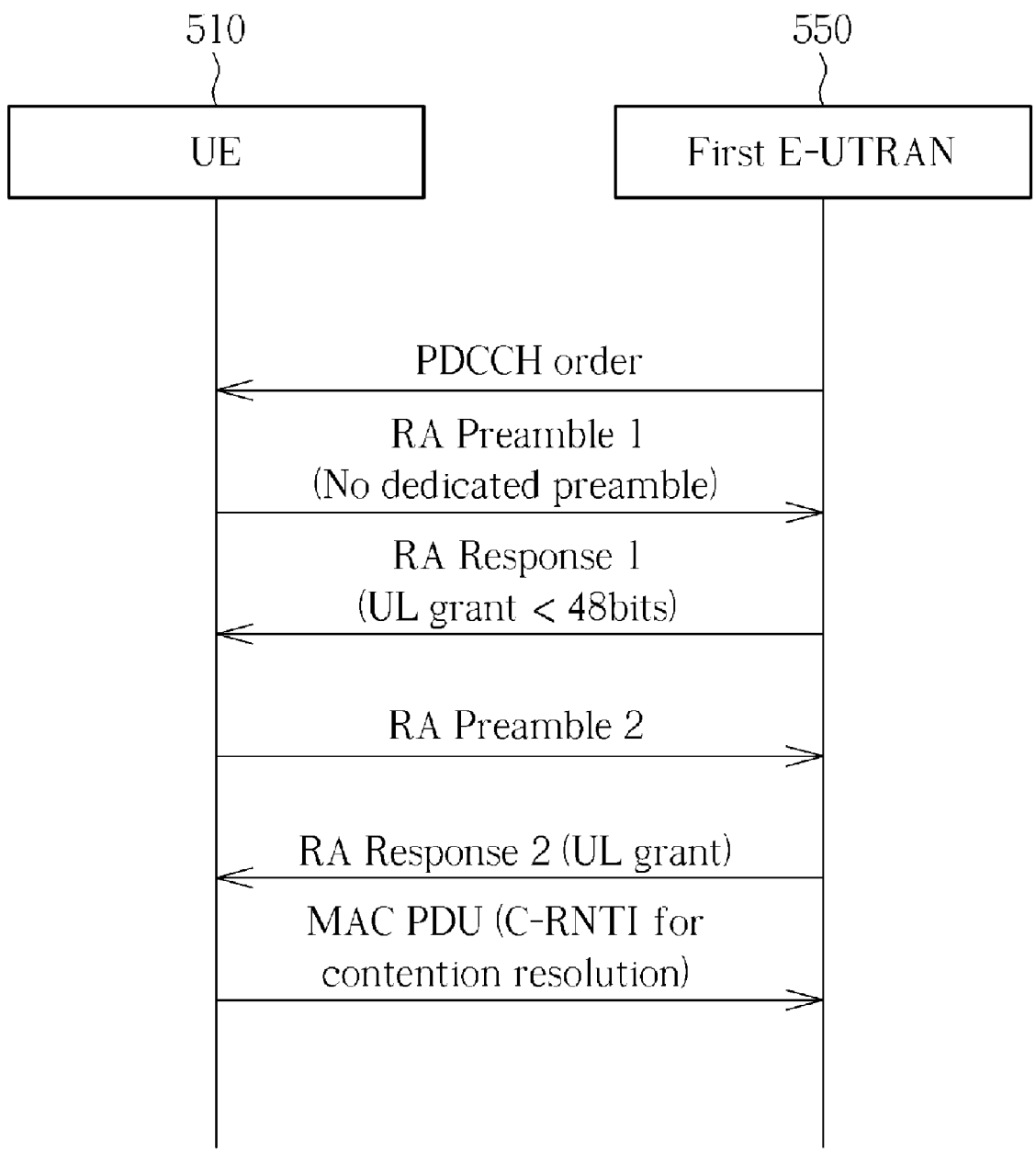
FIG. 13 is a diagram showing an RA procedure of the wireless communication system according to a sixth embodiment of the present invention.

Please refer to FIG. 13 in conjunction with the elements shown in FIG. 6. FIG. 13 is a diagram showing an RA procedure of the wireless communication system (including the UE and the first E-UTRAN) according to a sixth embodiment of the present invention. Following the fourth embodiment shown in FIG. 11, if the UE 510 receives the first RA response with a first UL grant having a size smaller than 48 bits for contention resolution and the first RA procedure is triggered by the PDCCH order, the UE 510 initiates a second RA procedure. The first E-UTRAN 550 receives a second RA preamble from the UE 510 and then transmits a second RA response corresponding to the second RA preamble, wherein a second UL grant is included in the second RA response. The UL grant determining module 580 of the first E-UTRAN 550 determines a second UL grant included in the second RA response according to a size of a predetermined MAC PDU subsequently transmitted from the UE, wherein the predetermined MAC PDU comprises a C-RNTI control element.

Figure 14:
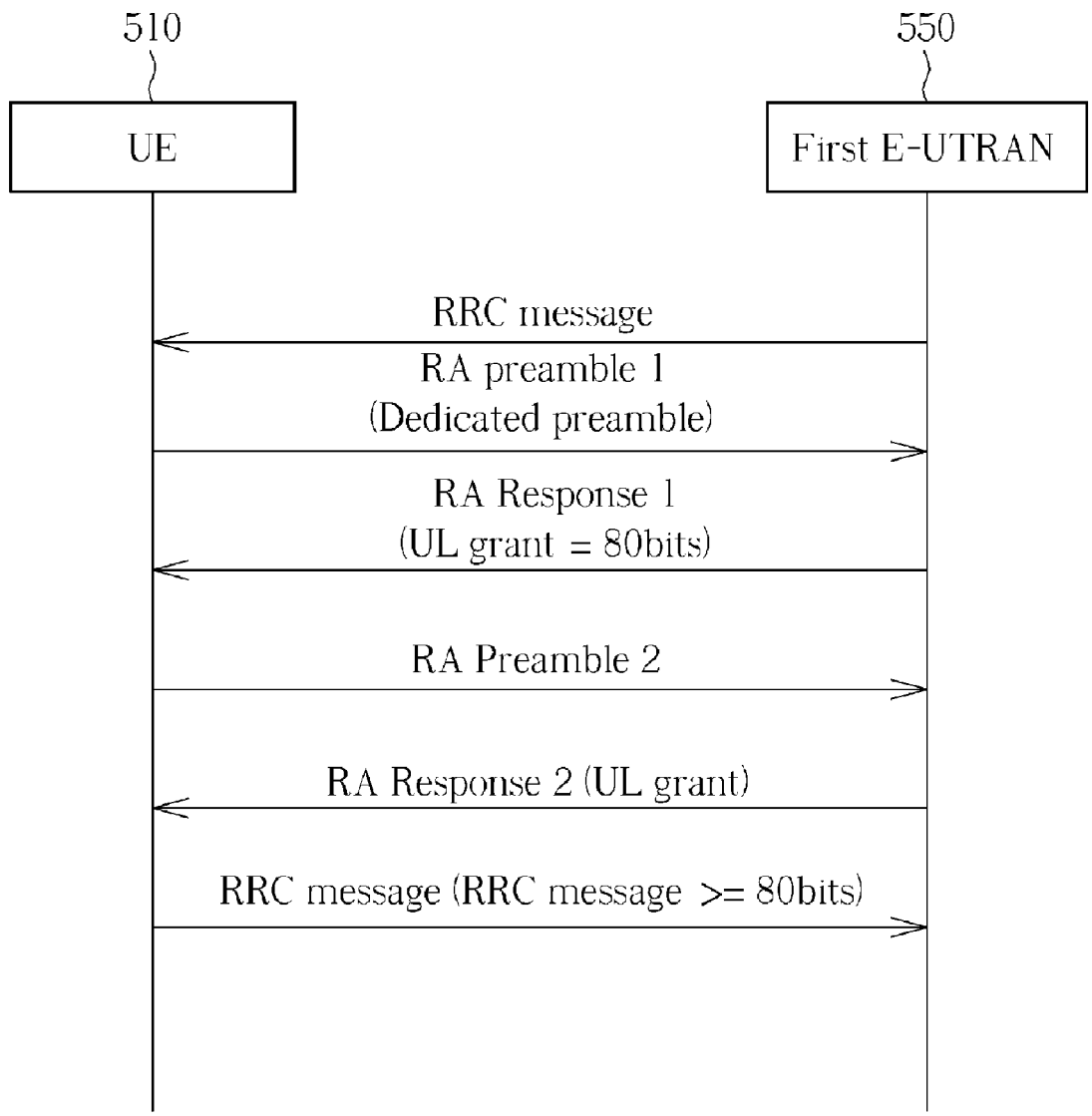
FIG. 14 is a diagram showing an RA procedure of the wireless communication system according to a seventh embodiment of the present invention.

Please refer to FIG. 14 in conjunction with the elements shown in FIG. 6. FIG. 14 is a diagram showing an RA procedure of the wireless communication system (including the UE and the first E-UTRAN) according to a seventh embodiment of the present invention. In this embodiment, the UE 510 is performing a RRC procedure via common control channel (CCCH) to the first E-UTRAN 550. The UE 510 transmits a first RA preamble to the first E-UTRAN 550, and the transmitting module 570 of the first E-UTRAN 550 then transmits the first RA response corresponding to the first RA preamble to the UE 510, wherein the first UL grant included in the first RA response is smaller than 80 bits. If a size of the predetermined MAC PDU subsequently transmitted from the UE 510 is greater than or equals 80 bits, the UE 510 initiates a second RA procedure to transmit a second RA preamble to the first E-UTRAN 550. The transmitting module 570 of the first E-UTRAN 550 then transmits a second RA response corresponding to the second RA preamble, wherein a second UL grant is included in the second RA response. The UL grant determining module 580 of the first E-UTRAN 550 determines the second UL grant included in the second RA response according to a size of a designated MAC PDU subsequently transmitted from the UE 510. The transmitting module 520 of the UE 510 then subsequently transmits the designated MAC PDU according to an RRC message, wherein the RRC message includes an RRC CONNECTION REQUEST message, an RRC CONNECTION RE-ESTABLISHMENT message, or an RRC CONNECTION RECONFIGURATION COMPLETE message need to be transmitted, and the size of the designated MAC PDU is greater than or equals 80 bits.

Figure 15:
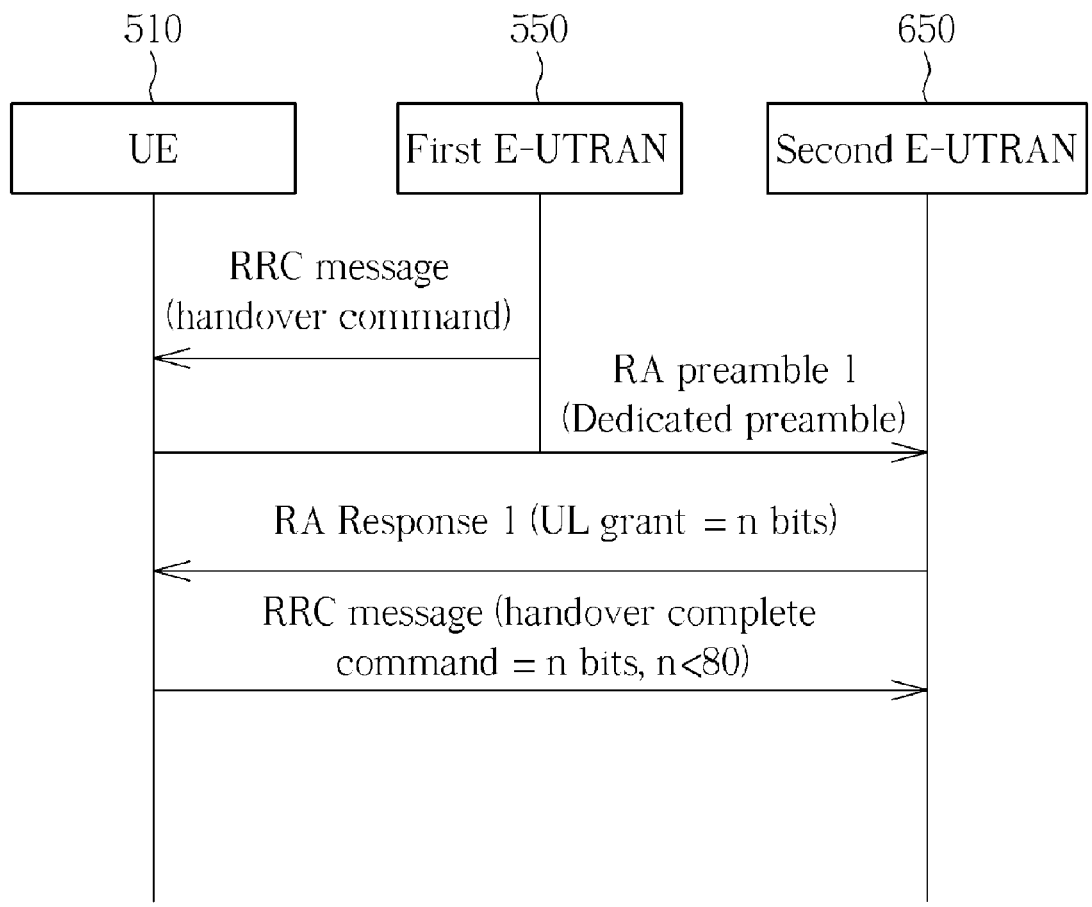
FIG. 15 is a diagram showing an RA procedure of the wireless communication system according to an eighth embodiment of the present invention.

Please refer to FIG. 15 in conjunction with the elements shown in FIG. 7. FIG. 15 is a diagram showing an RA procedure of the wireless communication system (including the UE, the first E-UTRAN, and the second E-UTRAN) according to an eighth embodiment of the present invention. In this embodiment, the UE 510 is handed over from the first UTRAN 550 to the second UTRAN 650. The transmitting module 560 of the first UTRAN 550 transmits an RRC message to the UE 510, wherein the RRC message includes a handover command. The UE 510 transmits a first RA preamble to the second UTRAN 650, and the transmitting module 670 of the second UTRAN 650 then transmits the first RA response corresponding to the first RA preamble to the UE 510, wherein the first UL grant included in the first RA response equals 80 bits. The transmitting module 520 of the UE 510 then transmits a designated MAC PDU as the predetermined MAC PDU according to an RRC message to the second E-UTRAN 650, wherein the RRC message comprises a handover complete command and the size of the designated MAC PDU is smaller than 80 bits. The UL grant determining module 680 of the second E-UTRAN 650 determines the size of the UL grant included in the RA response according to the size of the designated MAC PDU subsequently received from the UE 510. Therefore, radio resources can be saved and delays introduced from HARQ retransmissions can be reduced.

Of course, the abovementioned embodiments are merely examples for illustrating features of the present invention and should not be seen as limitations of the present invention. It will be obvious to those skilled in the art that various modifications on the mechanism for handling the UL grant in the RA response may be made without departing from the spirit of the present invention, and this should also belong to the scope of the present invention.

The abovementioned embodiments are presented merely for describing features of the present invention, and in no way should be considered to be limitations of the scope of the present invention. In summary, the present invention provides a method for handling Random Access Response reception in a UE and an E-UTRAN and related devices. By determining a length of the UL grant included in the RA response according to a size of a predetermined MAC PDU subsequently received from the UE, the E-UTRAN can assign a suitable length size of the UL grant for the UE. In some cases, the E-UTRAN can assign a smaller UL grant to the UE if the MAC PDU subsequently transmitted from the UE is very small (i.e. smaller than 80 bits). Therefore, not only radio resources and transmission power can be saved, but also the probability of erroneously decoding a MAC PDU can be reduced with a smaller size. In addition, the delay for RACH procedure can be reduced because less HARQ retransmissions are needed to decode a MAC PDU with a smaller size.

In other cases, a second RA procedure is initiated to transmit a second RA response with a second UL grant included if the MAC PDU subsequently transmitted from the UE is very large (i.e. greater than or equals 80 bits). Therefore, the mechanism for handling the UL grant in the RA response disclosed in the present invention can provide the UL grant of suitable sizes to the UE, which avoids the abovementioned problems of handling the UL grant in some scenarios.

Those skilled in the art will readily observe that numerous modifications and alterations of the device and method may be made while retaining the teachings of the invention.

What is claimed is:

1. A method for handling Random Access Response reception in a user equipment (UE) when communicating with an Evolved UMTS Terrestrial Radio Access Network (E-UTRAN), the method comprising:
    transmitting an RA preamble to the E-UTRAN for initialing a random access (RA) procedure according to a trigger event;
    receiving an RA response from the E-UTRAN corresponding to the RA preamble; and
    determining whether a media access control protocol data unit (MAC PDU) or another RA preamble need to be transmitted according to an uplink (UL) grant in the RA response and the trigger event.

2. The method of claim 1, further comprising:
    transmitting the MAC PDU comprising no data from an upper layer upper than a MAC layer of the UE when the trigger event is a packet data control channel (PDCCH) order and no data from the upper layer needs to be transmitted.

3. The method of claim 2, wherein the MAC PDU comprises a Buffer Status Report (BSR) control element or a padding.

4. The method of claim 1, further comprising:
    transmitting the MAC PDU when the UL grant indicates a size no less than 48 bits and the trigger event is the PDCCH order without a dedicated preamble.

5. The method of claim 4, wherein the MAC PDU comprises a Cell Radio Network Temporary Identity (C-RNTI) control element.

6. The method of claim 1, further comprising:
    transmitting the other RA preamble when the UL grant indicates a size less than 48 bits and the trigger event is the PDCCH order without a dedicated preamble.

7. The method of claim 1, further comprising:
    transmitting the other RA preamble when the UL grant indicates a size less than 80 bits, and the trigger event is an RRC CONNECTION REQUEST message, an RRC CONNECTION RE-ESTABLISHMENT message or an RRC CONNECTION RECONFIGURATION COMPLETE message need to be transmitted.

8. The method of claim 1, further comprising:
    transmitting the MAC PDU with a size of a minimum transport block (TB) when the UL grant is received and the trigger event is the PDCCH order with a dedicated preamble.

9. The method of claim 8, wherein the MAC PDU is used to confirm the reception of the RA response.

10. The method of claim 1, further comprising:
    transmitting the MAC PDU when the UL grant indicates a size less than 80 bits and the trigger event is a handover command received from another E-UTRAN.

11. A method for handling Random Access Response reception in an Evolved UMTS Terrestrial Radio Access Network (E-UTRAN) when communicating with an user equipment (UE), the method comprising:

receiving an RA preamble from the UE;
determining an uplink (UL) grant in an RA response corresponding to the RA preamble, wherein the UL grant indicates a size which is determined according to a trigger event used to trigger the RA preamble; and
transmitting the RA response to the UE.

12. The method of claim 11, further comprising:
transmitting the trigger event to the UE before receiving the RA preamble.

13. The method of claim 12, wherein the trigger event is a packet data control channel (PDCCH) order.

14. The method of claim 13, wherein the UL grant indicates a size no less than 48 bits when the trigger event is the PDCCH order without a dedicated preamble.

15. The method of claim 13, wherein the UL grant indicates a size of a minimum transport block (TB) or a value of the UL grant is 0 when the trigger event is the PDCCH order with a dedicated preamble.

16. The method of claim 15, further comprising:
receiving a MAC PDU used for confirming the reception of the RA response from the UE.

17. The method of claim 11, wherein the RA preamble is received within a specific duration from the trigger event is transmitted.

18. The method of claim 17, wherein the specific duration no less than a UE processing time plus a PDCCH transmission time plus a random access channel (RACH) transmission time plus a delay due to physical RACH (PRACH) allocation.

19. The method of claim 11, wherein the UL grant indicates a size less than 80 bits when the trigger event is a handover command.

20. A user equipment for handling Random Access Response reception when communicating with an Evolved UMTS Terrestrial Radio Access Network (E-UTRAN), the user equipment comprising:
a transmitting module, for transmitting an RA preamble to the E-UTRAN for initialing a random access (RA) procedure according to a trigger event;
a receiving module, for receiving an RA response from the E-UTRAN corresponding to the RA preamble; and
a determining module, for determining whether a media access control protocol data unit (MAC PDU) or another RA preamble need to be transmitted according to an uplink (UL) grant in the RA response and the trigger event.

21. The UE of claim 20, wherein the transmitting module is further used for:
transmitting the MAC PDU comprising no data from an upper layer upper than a MAC layer of the UE when the trigger event is a packet data control channel (PDCCH) order and no data from the upper layer needs to be transmitted.

22. The UE of claim 21, wherein the MAC PDU comprises a Buffer Status Report (BSR) control element or a padding.

23. The UE of claim 20, wherein the transmitting module is further used for:
transmitting the MAC PDU when the UL grant indicates a size no less than 48 bits and the trigger event is the PDCCH order without a dedicated preamble.

24. The UE of claim 23, wherein the MAC PDU comprises a Cell Radio Network Temporary Identity (C-RNTI) control element.

25. The UE of claim 20, wherein the transmitting module is further used for:
transmitting the other RA preamble when the UL grant indicates a size less than 48 bits and the trigger event is the PDCCH order without a dedicated preamble.

26. The UE of claim 20, wherein the transmitting module is further used for:
transmitting the other RA preamble when the UL grant indicates a size less than 80 bits, and the trigger event is an RRC CONNECTION REQUEST message, an RRC CONNECTION RE-ESTABLISHMENT message or an RRC CONNECTION RECONFIGURATION COMPLETE message need to be transmitted.

27. The UE of claim 20, wherein the transmitting module is further used for:
transmitting the MAC PDU with a size of a minimum transport block (TB) when the UL grant is received and the trigger event is the PDCCH order with a dedicated preamble.

28. The UE of claim 27, wherein the MAC PDU is used to confirm the reception of the RA response.

29. The UE of claim 20, wherein the transmitting module is further used for:
transmitting the MAC PDU when the UL grant indicates a size less than 80 bits and the trigger event is a handover command received from another E-UTRAN.

30. An Evolved UMTS Terrestrial Radio Access Network (E-UTRAN) for handling Random Access Response reception when communicating with an user equipment (UE) comprising:
a receiving module, for receiving an RA preamble from the UE;
a UL grant determining module, for determining an uplink (UL) grant in an RA response corresponding to the RA preamble, wherein the UL grant indicates a size which is determined according to a trigger event used to trigger the RA preamble; and
a transmitting module, for transmitting the RA response to the UE.

31. The E-UTRAN of claim 30, wherein the transmitting module is further used for:
transmitting the trigger event to the UE before receiving the RA preamble.

32. The E-UTRAN of claim 31, wherein the trigger event is a packet data control channel (PDCCH) order.

33. The E-UTRAN of claim 32, wherein the UL grant indicates a size no less than 48 bits when the trigger event is the PDCCH order without a dedicated preamble.

34. The E-UTRAN of claim 32, wherein the UL grant indicates a size of a minimum transport block (TB) or a value of the UL grant is 0 when the trigger event is the PDCCH order with a dedicated preamble.

35. The E-UTRAN of claim 34, wherein the receiving module is further used for:
receiving a MAC PDU used for confirming the reception of the RA response from the UE.

36. The E-UTRAN of claim 30, wherein the RA preamble is received within a specific duration from the trigger event is transmitted.

37. The E-UTRAN of claim 36, wherein the specific duration no less than a UE processing time plus a PDCCH transmission time plus a random access channel (RACH) transmission time plus a delay due to physical RACH (PRACH) allocation.

38. The E-UTRAN of claim 30, wherein the UL grant indicates a size less than 80 bits when the trigger event is a handover command.

* * * * *

UNITED STATES PATENT AND TRADEMARK OFFICE
CERTIFICATE OF CORRECTION

| | | |
|---|---|---|
| PATENT NO. | : 8,228,851 B2 | |
| APPLICATION NO. | : 12/264186 | |
| DATED | : July 24, 2012 | |
| INVENTOR(S) | : Chih-Hsiang Wu | |

It is certified that error appears in the above-identified patent and that said Letters Patent is hereby corrected as shown below:

In the Specification:

Column 2, line 22, replace the words "packet data control channel" with --physical downlink control channel--.

In the Claims:

In claim 2, at column 8, line 29, replace the words "packet data control channel" with --physical downlink control channel--.

In claim 13, at column 9, line 11, replace the words "packet data control channel" with --physical downlink control channel--.

In claim 21, at column 9, line 50, replace the words "packet data control channel" with --physical downlink control channel--.

In claim 32, at column 10, line 42, replace the words "packet data control channel" with --physical downlink control channel--.

Signed and Sealed this
Ninth Day of September, 2014

Michelle K. Lee
*Deputy Director of the United States Patent and Trademark Office*